(12) United States Patent
Jones

(10) Patent No.: US 8,000,889 B2
(45) Date of Patent: Aug. 16, 2011

(54) APPARATUS FOR AND METHOD OF PROVIDING DATA TO AN EXTERNAL APPLICATION

(75) Inventor: Alan Henry Jones, Histon (GB)

(73) Assignee: Cotares Limited, Cambridgeshire (GB)

( * ) Notice: Subject to any disclaimer, the term of this patent is extended or adjusted under 35 U.S.C. 154(b) by 1159 days.

(21) Appl. No.: 11/574,329

(22) PCT Filed: Sep. 6, 2005

(86) PCT No.: PCT/EP2005/054383
§ 371 (c)(1),
(2), (4) Date: Feb. 27, 2007

(87) PCT Pub. No.: WO2006/027354
PCT Pub. Date: Mar. 16, 2006

(65) Prior Publication Data
US 2009/0088962 A1    Apr. 2, 2009

(30) Foreign Application Priority Data

Sep. 10, 2004 (GB) .................................. 0420097.8
Apr. 25, 2005 (GB) .................................. 0508267.2

(51) Int. Cl.
*G01C 21/26* (2006.01)
*G08G 1/123* (2006.01)
*G07C 5/08* (2006.01)
(52) U.S. Cl. .......................... 701/200; 701/207; 701/209
(58) Field of Classification Search .................. None
See application file for complete search history.

(56) References Cited

U.S. PATENT DOCUMENTS

| | | | |
|---|---|---|---|
| 4,750,197 A | 6/1988 | Denekamp et al. | |
| 5,642,285 A | 6/1997 | Woo et al. | |
| 5,878,368 A * | 3/1999 | DeGraaf | 701/209 |
| 5,905,451 A * | 5/1999 | Sakashita | 340/988 |
| 6,212,473 B1 * | 4/2001 | Stefan et al. | 701/210 |
| 6,609,064 B1 * | 8/2003 | Dean | 701/213 |
| 6,941,224 B2 * | 9/2005 | Fukuyasu | 701/213 |
| 6,958,692 B1 * | 10/2005 | Ratschunas | 340/539.13 |
| 7,113,889 B2 * | 9/2006 | Hatano et al. | 702/183 |
| 7,779,065 B2 * | 8/2010 | Gupta et al. | 709/202 |
| 2001/0034577 A1 | 10/2001 | Grounds et al. | |
| 2002/0143490 A1 * | 10/2002 | Maeda et al. | 702/150 |
| 2002/0161517 A1 | 10/2002 | Yano et al. | |
| 2002/0167519 A1 | 11/2002 | Olsen | |

(Continued)

FOREIGN PATENT DOCUMENTS

EP    0959418 A2 * 11/1999

(Continued)

OTHER PUBLICATIONS

PCT International Search Report dated Feb. 7, 2006.

(Continued)

*Primary Examiner* — Michael J. Zanelli
(74) *Attorney, Agent, or Firm* — Patterson & Sheridan, LLP

(57) ABSTRACT

A method of providing data to an external application is provided. The location and time of an object are periodically recorded to form a record of sightings. The record of sightings is then analysed in accordance with at least one criterion specified by the external application to which the data is to be provided. Lists of sightings from the record meeting the at least one criterion are supplied for use by the external application.

12 Claims, 6 Drawing Sheets

U.S. PATENT DOCUMENTS

| | | | |
|---|---|---|---|
| 2002/0171673 A1* | 11/2002 | Brown et al. | 345/700 |
| 2003/0020816 A1 | 1/2003 | Hunter et al. | |
| 2003/0032448 A1* | 2/2003 | Bulthuis et al. | 455/556 |
| 2003/0083815 A1 | 5/2003 | Denton | |
| 2003/0100993 A1 | 5/2003 | Kirshenbaum et al. | |
| 2003/0137407 A1 | 7/2003 | Hessling et al. | |
| 2004/0015291 A1* | 1/2004 | Petzold et al. | 701/202 |
| 2004/0104842 A1 | 6/2004 | Drury et al. | |
| 2004/0192343 A1* | 9/2004 | Toyama | 455/456.1 |

FOREIGN PATENT DOCUMENTS

| | | |
|---|---|---|
| EP | 0967460 A1 | 12/1999 |
| WO | 0169176 A1 | 9/2001 |
| WO | 03081559 A1 | 10/2003 |
| WO | 2004074778 A1 | 9/2004 |

OTHER PUBLICATIONS

British Search Report, date of search Jan. 24, 2005.
Natalia Marmasse et al., "A User-Centered Location Model," Personal and Ubiquitous Computing, 2002 vol. 6: pp. 318-321.

* cited by examiner

APPARATUS FOR AND METHOD OF PROVIDING DATA TO AN EXTERNAL APPLICATION

FIELD OF INVENTION

The present invention relates to an apparatus for and a method of providing data to an external application. The present invention also relates to a program for controlling a computer to perform such a method, a carrier medium carrying such a program, transmission across a communication path, such as a data network, of such a program, and to a computer programmed by such a program.

BACKGROUND TO THE INVENTION

Marmasse and Schmandt "A User-centred Location Model", Personal and Ubiquitous Computing, 2002, vol. 6, pp 318-321, Springer-Verlag London Limited disclose a system for learning frequented places by noting locations where a vehicle or user has often been stationary for some while. A user is then invited to name such a place, at which time it becomes a candidate for prediction. There is also a training phase, where it appears that the journey models in use are fed with trial journeys already classified by researchers as the route to which they belong. This is a phase which requires much user intervention, including associating trial runs of a route with its particular model, and is not appropriate for an automated system. The training data for each route is used to train a variety of models, such as a Bayes Classifier, Histogram Modelling and a Hidden Markov Model.

US 2002/0161517 A1 by Pioneer discloses a system for predicting a destination using the following: (a) those destinations that a user has entered in the past, (b) a road mapping database, (c) the recent history of the current journey, and (d) a travel information database built by matching past journeys against the road mapping database. It only begins to record the route used to a destination once such a destination has been identified. It therefore generally requires user intervention to identify destinations before it can be of use. There is a suggestion that the system could detect a position where the engine of a vehicle is stopped regularly and record that as a destination point. After that time, if the user selects that point as a destination, then the system could learn a route to it and begin to predict it automatically. However, the user still has to select that point manually as a destination at some stage.

EP0967460 A1 discloses a system for learning a commute route, that is, a single route along which the driver travels most frequently. It requires the user to enter a time window during which the commute is made, or uses a default time setting, and then attempts to deduce the commute route by storing the route most recently used, by storing a composite route whose derivation is undefined, or by counting how many times each road segment from a mapping database is traversed during that time window and using the most frequently traveled road segments as the commute route.

STATEMENTS OF THE INVENTION

According to a first aspect of the invention, there is provided a method of providing data to an external application. The method generally includes periodically recording the location and time to form a record of sightings of an object, analying the record of sightings in accordance with at least one criterion specified by the external application, and supplying lists of sightings from the record meeting the at least one criterion for use by the external application.

Other aspects and embodiments of the invention are defined in the other appended claims.

BRIEF DESCRIPTION OF THE DRAWINGS

The invention will be further described, by way of example, with reference to the accompanying drawings, in which.

DETAILED DESCRIPTION OF THE DRAWING

Figure 1:
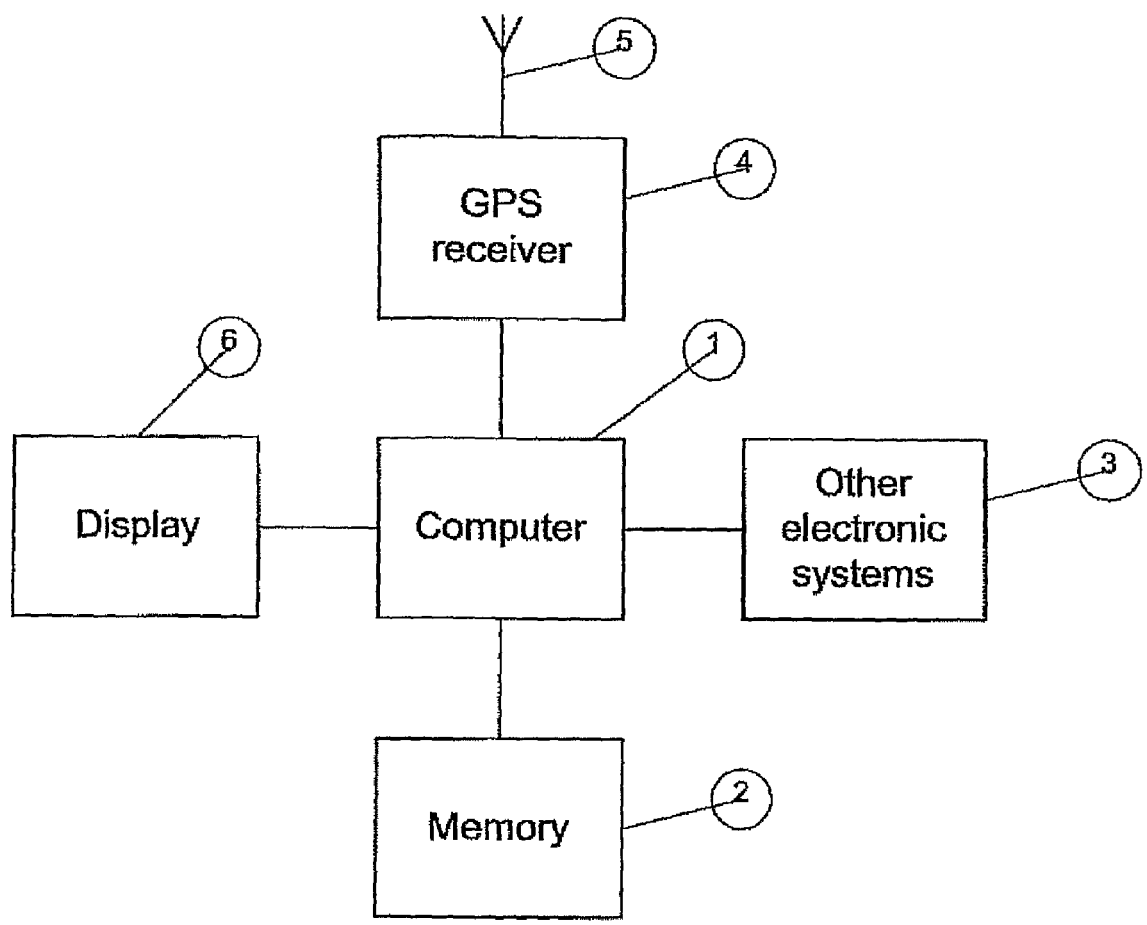
FIG. 1 is a schematic diagram of an apparatus embodying the present invention

The following is a glossary of terms used hereinafter with explanations of their meanings.

A break in the motion represented by a sequence of sightings is a period of time over which the locations represented by the sightings are not changing significantly. There may be a small amount of drift caused by the error characteristics of a positioning system, or there may be no sightings at all if they have been suppressed or the positioning system has been powered down.

An external position is used to describe where some object is to be found, or some event takes place, in some outside coordination system. It may be given in terms of a map projection grid such as Universal Transverse Mercator (UTM), with or without altitude, or in terms of latitude and longitude to some datum such as the World Geodetic Standard 1984 (WGS84), or in a rectilinear coordinate system such as WGS84 Earth Centred Earth Fixed (ECEF).

GPS is the United States Global Positioning System, one of several satellite navigation systems that enable the position of an antenna to be found to within a few meters under good signal conditions. It also provides time information to an accuracy of better than 1 microsecond.

GPS time is an absolute time standard which tracks Universal Time Coordinated (UTC), one of the observational time standards based on the daily rotation of the earth. It differs from UTC by up to 1 microsecond, but is calibrated against it to better than 200 ns. As it is not adjusted for the rotational period of the earth around the sun (leap-second adjustment), it also differs from UTC by the addition of a small integer number of seconds. The unadjusted atomic timescale from which UTC and GPS time obtain their measure of the second is called TAI (International Atomic Time), so TAI minus GPS time is very close to a constant integral number of seconds, which was the 19 second time offset between TAI and UTC when GPS time began in 1980.

A journey is a sequence of sightings between two significant locations that form the ends of the journey. In this system, we define journeys as sequences of sightings between significant breaks. Whether a break is considered significant is defined by the particular algorithm and parameters in use, but we generally set the parameters to exclude short breaks within longer periods of motion. With appropriate settings, a three hour period of driving with a one hour break to eat in the middle will be considered as a single journey, but a fifteen minute trip to shop for fifteen minutes, followed by a fifteen minute journey home would be consider to be two separate journeys.

The location of an event is its position expressed in the coordinate system in use. For example, we use latitude, longitude and altitude in the WGS84 datum expressed as floating point values. The use of altitude is optional, but can be used to enhance various features of the software if present.

A sighting is a record of the location of an object together with the time at which it was detected at that location.

A sighting array is a sequence of sighting records stored in an array.

A sighting index is an integer specifying an element of a sighting array.

A point is a specially selected sighting index, where the location of that sighting is known to map to a particular pixel on a display screen, or has been selected by other criteria such as proximity to a given location or time. Many points may be mapped to the same pixel, and not all locations in a database may be shown as points, for example, if only sightings taken in the last year are displayed. The user may select points using a mouse, cursor keys or other input means, and the software can determine which locations correspond to those selected points.

A set of points is a collection of points where the order of the points and any duplicates are not relevant. They may as well be sorted into ascending order and duplicates eliminated if this allows for more efficient processing.

A list of points has a defined ordering of its own, and duplicates may be significant.

WGS84 is the World Geodetic System of 1984, and is the primary coordinate system used by GPS. It is a rectilinear coordinate system defined by adopting coordinates for stations around the globe such that the origin of the system is close to the centre of mass of the earth (to within a few meters), thus making it particularly useful for satellite based systems such as GPS. Such coordinate systems are called Earth Centred Earth Fixed (ECEF). If there are major disturbances such as movements along geological fault lines, then station coordinates can be adjusted to avoid discontinuities in the overall coordinate system. The z axis is aligned with the rotational axis of the earth as defined by the International Earth Rotation Service, and the x and y axes are defined by reference to an adopted meridian close to the Greenwich meridian. There is also an associated ellipsoid so that coordinates can be expressed as Latitude, Longitude and Altitude in the WGS84 datum.

FIG. 1 shows an apparatus in the form of a computer 1 with a program memory 2, such as a ROM, flash memory, a hard disk drive and/or an optical disk drive, installed in a vehicle such as an automobile. However, embodiments of the invention are not limited to use in vehicles and may be attached to or installed in other objects. For example, such an apparatus may be installed in a cellular or mobile telephone, for example of the type which receives information about its geographical location and about the current time.

The vehicle comprises vehicle electronics 3, which monitor and control many of the systems on board the vehicle. The computer 1 is thus able to receive information about various aspects of the current state of the vehicle as described hereinafter.

The vehicle is further provided with a GPS receiver 4 for determining the location of the vehicle and the current time from signals received from the GPS via an aerial 5. This information is also supplied to the vehicle electronics 3, for example so as to provide the function of a satellite navigation or "Sat Nav" system.

The computer 1 is also provided with an output device 6 for providing a human-perceivable output. The output device 6 is illustrated in the form of a display, for example forming part of the Sat Nav system or of an in-vehicle entertainment system, but may alternatively or additionally comprise an audio output device such as a loudspeaker.

Although the computer 1, the program memory 2 and the receiver 4 are shown as separate items in FIG. 1, they may be embodied by a single apparatus which may also include the display 6.

In use, the computer stores a record of sightings of the vehicle and processes such sightings, optionally together with further information about the vehicle state from the vehicle electronics 3, in order to present to a driver one or more predictions as to the future behaviour of the vehicle. The record of the sightings forms a log of the past and current journeys of the vehicle, the sightings comprising at least <location, time> tuples. These may be further augmented with other information, such as the ignition key used, the seat memory in use, the doors used, window positions, mirror positions, transmission settings, seat occupancy or weights, entertainment channel selected, incoming or outgoing telephone calls, external and internal temperature, axle loadings, rain sensor output, towbar usage, traffic reports, pollution levels, and ventilation or air conditioning settings. Such information is processed by the computer 1, for example to output predictions of possible destinations, routes, speed, stops, breaking, acceleration, cornering, and any of the additional information forming part of the journey log. Other parameters may be computed from such predictions, such as fuel consumption, distraction level and tiredness. The predictions are based upon matching of the most recent sightings with sequences of sightings in past journey logs using both spatial and temporal data to identify matches. The matching may also take into account any of the additional data mentioned above, such as the ignition key used, the number of passengers or the settings of entertainment equipment, when these are made available to the computer 1 from the vehicle electronics 3.

When the apparatus is installed in a vehicle and commissioned, it starts to record information about vehicle journeys. This is done by recording the location of the vehicle from the on-board GPS receiver 6 at frequent intervals, particularly while the vehicle ignition is switched on. A location update rate of one location per second is generally adequate for this application and a location accuracy within 50 meters (50 m) is commonly available. We record the location as latitude, longitude and altitude to better than 1 m precision, using the WGS84 datum. This is a good globally defined coordinate system, but most other two or three dimensional coordinate systems would suffice, such as WGS84 Earth Centred Earth Fixed (ECEF), Ordnance Survey Grid, or Universal Transverse Mercator (UTM).

The altitude is not necessary for many applications, and is not sensed by some location systems. For such applications, a coordinate system where it can be omitted is preferable. When present, it can be used to:
    extend some of the two-dimensional matching algorithms described hereinafter to three dimensions
    give extra feedback to the user, for example, by distinguishing gradients and overpasses analyse aspects of routes traveled in three dimensions.

The use of altitude becomes more important if the vehicle itself is not constrained to travel on the surface of the earth, such as an aircraft.

We also record the time at which the vehicle was at each location. The combination of location, altitude when used and time is called a sighting. The time is stored as the number of seconds within the current week as a single precision floating point number and each series of sightings is stored in files whose name identifies the day on the Julian calendar, so that it is a simple task to compute the absolute time of any sighting. The time base used is GPS time, which tracks the international time standard UTC but does not include the leap seconds so that calculations are simplified. Other time systems such as UTC or TAI could equally well be used. While the absolute accuracy of the GPS positions is usually around 10 m, we do record them to a higher precision (1 m) so that we can take advantage of their better relative error and do not add large quantisation errors when computing data such as speeds.

The number format used is IEEE 754 single precision and we add an extra byte (newline 0x0A) as a check at the end of each sighting record to help detect if any file has become corrupted or is in the wrong format. Each sighting takes 17 bytes as follows:
Bytes 0-3: WGS84 Latitude in radians (referred to as lat)
Bytes 4-7: WGS84 Longitude in radians (referred to as lon)
Bytes 8-11: WGS84 Altitude in meters (referred to as alt)
Bytes 12-15: GPS time of week in seconds (referred to as time)
Byte 16: 0x0A (referred to as separator)

With the continuing decrease in storage costs and the increase in accuracy of common positioning systems such as GPS, other implementations might choose to use double precision floating point formats, integer formats based on microradians or millidegrees of latitude and longitude, or even ASCII formats such as degrees and decimal degrees used by NMEA 0183.

Sequences of sightings are stored in files whose names follow the convention "yymmddxx.pat" where yy are the last two digits of the year, mm is the index of the month, dd is the day within the month, and xx is an incrementing alphabetic field used to distinguish multiple files recorded on the same day. The file name is chosen at the time of the first sighting in the file. For example, files 030821AA.pat and 030821AB.pat would be the first two files that began on 21 Aug. 2003.

Sightings are stored into these files automatically whenever the vehicle ignition is switched on, and a new file is begun each time the engine is started. If power allows, sightings could also be stored when the ignition is switched off to cover situations such as car ferry journeys or to confirm that the system has not missed any movements. In this case, it would be convenient to start a new file at least each day, and perhaps every hour. The reason for storing the sightings in multiple small files is to allow subsets of them to be easily selected for opening, backup or communication, to give some resilience against disk or filing system failures, and to allow computer systems with limited resources to be able to manipulate them easily.

Other implementations could choose to store all of the sightings in a single file, perhaps under the control of database software. Other information could also be stored in these files, such as the registration number of the vehicle that the sightings refer to, the name of the driver, external events such as traffic reports, weather conditions or indeed anything that may be relevant to the later processing of these sightings. To keep this explanation simple, we will consider the case of sightings files that just contain latitude, longitude, altitude and time information.

Other events can be stored in external files and associated with these sightings by their position in a directory hierarchy (for example by grouping all of the files of sightings for some particular vehicle in a directory named by the registration number of that vehicle), or by the time of the sighting (for example by recording the time that a particular driver started and stopped a vehicle and then finding the sightings closest to those times).

To begin with, the files of sightings are sorted into ascending time order and then the locations are extracted from each file in that order into a single ordered list. As part of the extraction process, the sightings are bounds checked to ensure that all values lie within sensible limits and, if any do not, the entire contents of the file are left out of the list and an error report is generated. Also as part of the extraction process, the time of a sighting stored in the list is expressed as the number of seconds since the beginning of GPS time on 1 Jan. 1980 so that the original file name is no longer relevant.

Next, the single list is sorted so that the time of each successive sighting is greater than or equal to its predecessor. This sorting operation is quite efficient because the bulk of the sorting is performed by sorting the files by their names before the points are extracted. The sorting of the points themselves is necessary in case files have been brought together from different systems such as vehicle tracking or mobile phone tracking, or in case clocks have been adjusted. This also provides a further check on the integrity of the data as we can now reject sequences of sightings that lie outside reasonable bounds on earliest and latest sightings and on the basis of speed between two successive sightings in time.

Figure 2:
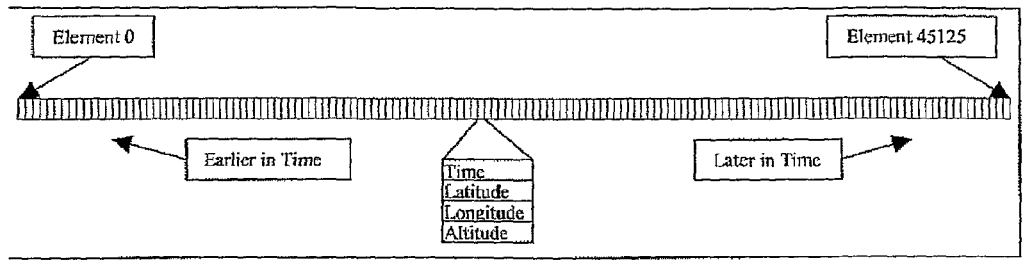
FIG. 2 is a time ordered array of records of sightings stored in th memory for the apparatus of FIG. 1.

When we use the terms "previous sighting" and "next sighting", we are referring to the position within this single ordered list. This list may be stored on disk or in memory as one single sequence of bytes containing the lat/lon/alt/time/separator sequences back to back, or as separate sequences of lat, lon, alt and time, or as data structures such as arrays or lists of sightings, latitudes, longitudes, altitudes and times. The detailed choice of storage format is determined by the particular computer configurations upon which the software is to be run, but always supports the basic operation of retrieving the sightings sequentially by index or pointer, so that the index or pointer may later be used as a reference to retrieve the sighting information. The format that we use in memory is an array of structures (records). Each structure contains the latitude, longitude, altitude and time of a particular sighting. The array is sorted into time order as described earlier, with the first element (element 0) being the earliest sighting, and the last element being the latest sighting in the sequence. A structure of this type is illustrated in FIG. 2.

A journey is some sequence of sightings between two significant events, such as first leaving home in the morning and later arriving at work. There is no single definition of what constitutes a journey; it depends on the user and the context and how the journey information is going to be used. If the vehicle is stationary for some period of time, we call this period a "break period" and identify the first and last sightings in the break period as the end and beginning of the respective surrounding journeys.

One simple journey definition that works for vehicles is to use the time that the ignition of the vehicle is switched on as the start of a new journey, and the next time that the ignition is switched off as the end of that journey. We may be able to detect and timestamp the actual turning on and off of the ignition by allowing a computer to sense the state of the ignition circuits or the ignition key position. Alternatively, the positioning system may be arranged to only generate sightings while the ignition is turned on, so a long time period with no sightings could be taken to indicate a break between journeys. It is also possible that the processor that is storing the sightings is only powered on while the ignition is on, and this again would allow us to interpret a long time period with no sightings as a break between journeys.

Another definition, which works for systems where the positions are generated even while the ignition is switched off, is to look for periods where the vehicle makes very little or no progress. Here, we search for a sequence of sightings where the velocity of the vehicle (as measured directly or by computing the speed between two successive sightings) stays below some threshold determined by the maximum possible error velocity that might be measured for a stationary vehicle (e.g. 1 mph) for some period (e.g. over 1 minute) as the break between journeys, marking the first sighting in the sequence as the end of a journey and the last sighting in the sequence as the start of a journey. This has the advantage of potentially identifying short journeys where the ignition may not be switched off, such as when the driver waits while someone delivers a parcel, not breaking journeys where the ignition is switched off for just a short time, such as while waiting for a train to pass at a level crossing, and not being reliant on the proper detection and recording of the ignition state.

In case the vehicle is moving very slowly for a prolonged period, an improvement on the velocity-based heuristic is to mark all periods in the sequence where the vehicle remained within some error margin (typically 50 m) of the same position for more than some period of time (call this Bmin, typically three minutes), or where there is a gap in the sightings with a time interval of greater than Bmin.

The algorithm used to identify the breaks will be dependent on the properties of the particular positioning system in use. For example, a GPS system might produce a sighting every second regardless of progress. In this case, a vehicle would have to move faster than 110 mph (180 km/h) to cover 50 m between successive sightings, so to identify breaks, we have to look across a number of sightings.

A suitable algorithm is to look at sequences of sightings spaced Bmin apart in time, to see how far the vehicle had moved in that time; and an example is as follows.

Step 1: Call the earliest sighting SightingA and set SightingX equal to SightingA.

Step 2: For each SightingA, find the furthest subsequent sighting for which the time of that sighting is less than 3 minutes from the time of sightingA. Call that SightingB.

Step 3a: If SightingB is less than 50 m away from SightingX, then mark all the sightings from SightingA to SightingB as part of a break period, leave SightingX unchanged, and make SightingA the next sighting after SightingA.

Step 3b: If SightingB is more than 50 m away from SightingX, then do not mark any break sightings, and make the new SightingA and the new SightingX the next sighting after SightingA.

Step 4: If SightingA has not reached the end of the list of sightings, then repeat from step 2; otherwise, the marking of all break periods has been completed.

Figure 3:
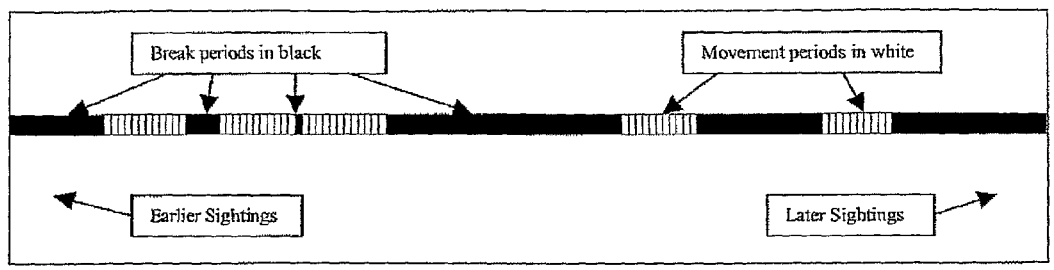
FIG. 3 is a variation of the array of FIG. 2 showing break periods.

This algorithm could mark a long break even when the vehicle was moving very slowly (less than 50 m in three minutes or about 0.6 mph (1 km/h)), so this would also be considered to be a potential break between journeys. An example of marked break periods is show in FIG. 3.

If a different behaviour was required, or depending on the drift and dropout characteristics of the particular positioning system in use, then various modifications to this algorithm could be used.

Figure 4:
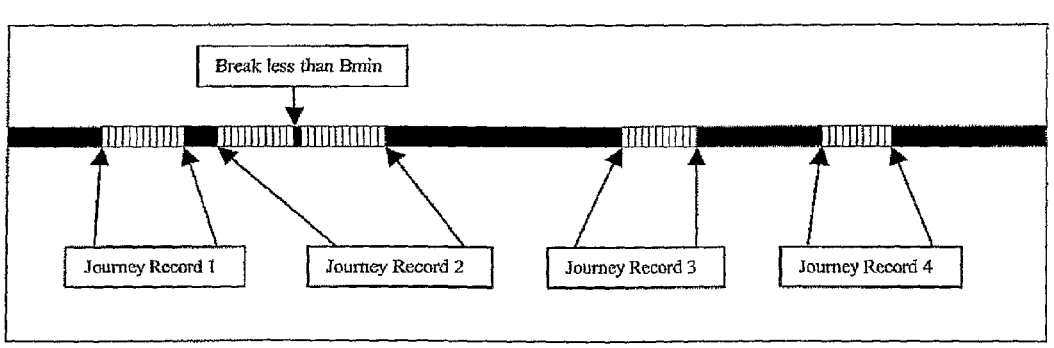
FIG. 4 is a variation of the array of FIG. 3 showing journey records.

Now that we have identified potential break periods, we create a journey record for each period of movement between the break periods. This journey record contains a reference to the sighting just at the end of the first break period, and a reference to the sighting just at the beginning of the next break. These are the begin and end references for the journey record. Such a journey labelling is show in FIG. 4.

We now want to determine which of those breaks are significant to the application for which we are computing them.

Figure 5:
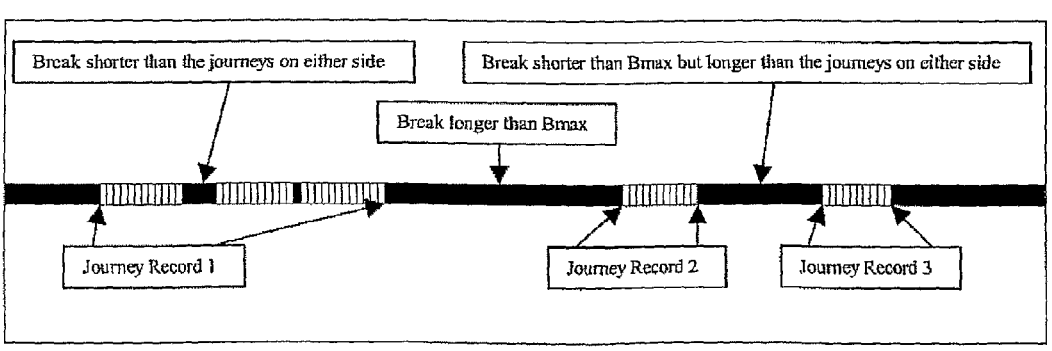
FIG. 5 is a variation of the array of FIG. 4 showing journey records merged Into longer journeys where appropriate.

We consider each break period in turn, starting with the earliest in time and working through to the latest in time. If the length of time of a break period is less than the length of time of the journey preceding or succeeding it, and less than a certain threshold (call this Bmax, typically thirty minutes), then we merge those journeys into one new one on the grounds that this was a temporary stop in the midst of a longer journey. This is illustrated in FIG. 5.

For example, a sequence of five minutes of driving followed by a six minute stop followed by five minutes of driving would be considered to be two distinct journeys, perhaps going out specially to fill a car with petrol or pick up something at nearby shops. A sequence of one hour of driving followed by a six minute stop followed by a half hour of driving would be considered to be all one journey, perhaps stopping for petrol or a snack on the way to somewhere else.

We repeat the merging process until all the break periods of less than the Bmax threshold are flanked by at least one journey of shorter length than the break period.

There are many similar heuristics that could be used to identify journeys, and in some applications, it may be advantageous to tailor the definition of a journey to the particular requirements of the application, for example by using a different heuristic or by adjusting the parameters such as Bmax and Bmin.

Once the journeys have been identified, we create a record in the computer for each one. This record refers to the sightings in the main list that begin and end the journey. These sightings contain the positions and times of the start and end of the journey. We further augment each journey record with the latitude and longitude of the smallest bounding box that includes all of the points in that journey. This information is used to speed up many algorithms that search or display the past journeys.

Figure 9:
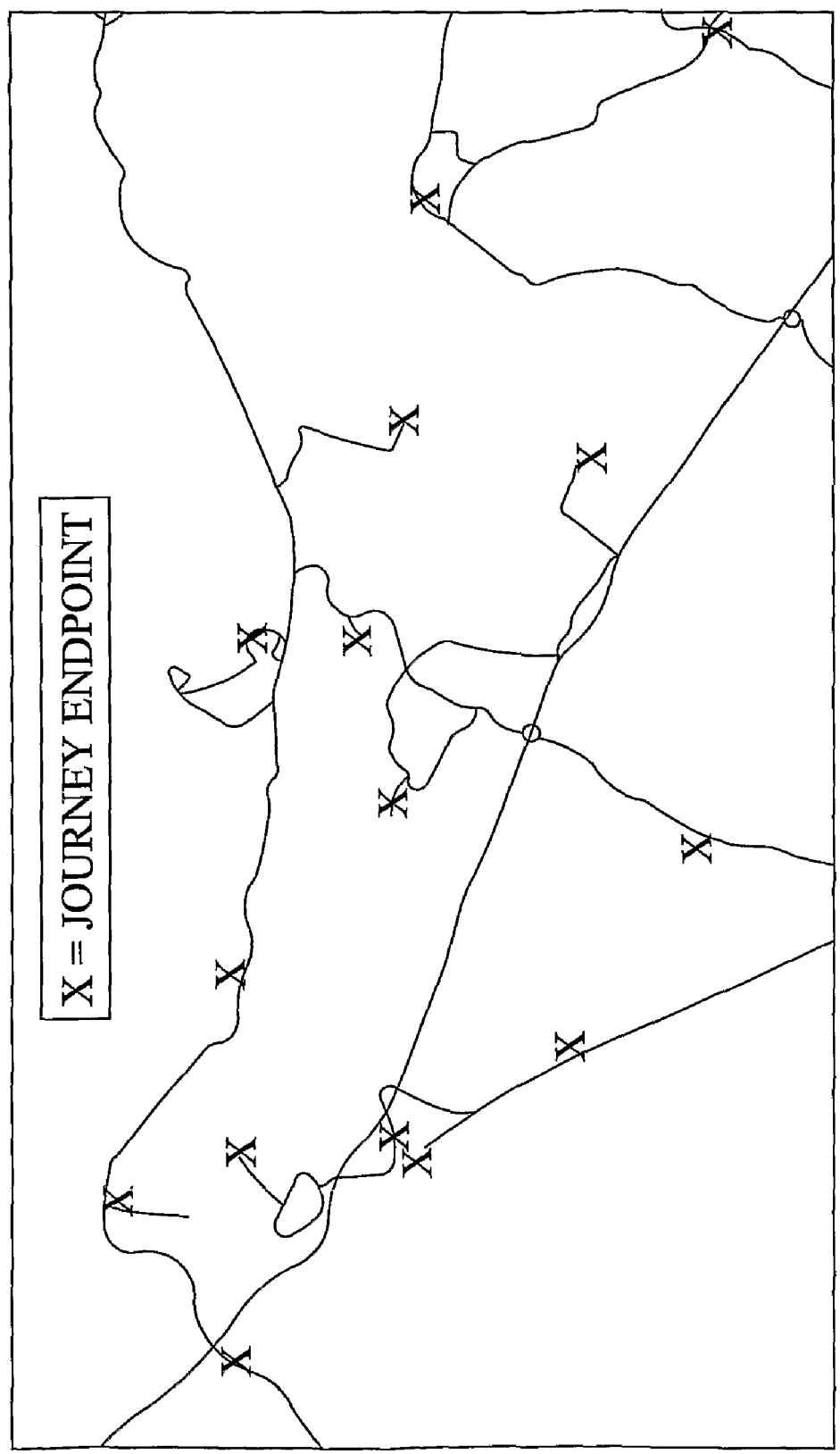
FIG. 9 is a map view of many sightings with journey end-points highlighted.

For example, FIG. 9 shows a map view of many sightings, with the first ten and the last ten sightings of each identified journey being highlighted by using larger black dots.

Another useful optimisation is to compute the cumulative distance of each sighting from the earliest sighting (called sighting0) when the entire list is first sorted. In this way, the cumulative distance from some sightingX to sightingY can be found by subtracting the cumulative distance from sighting0 to sightingX from the cumulative distance from sighting0 to sightingY, thus saving many small computations.

The speed and acceleration represented by each portion of the sequence is also useful in further computations and display, and also as a check on the validity of the observations. We compute speeds and accelerations for every group of five points and check that these lie within certain bounds of validity given the capabilities of the vehicle and the inherent error characteristics of the sensor system. Where the points lie outside the valid bounds, for example, if the speed is greater than 150 mph (240 km/h), or the acceleration is greater than 10 ms$^{-2}$ over a distance greater than the known instantaneous error of the positioning sensor, then we will reject these five points and also a number of points before and afterwards, typically one minute's worth. For those points that remain, we may choose to keep the speeds or accelerations cached in the computer memory or stored on disk with the validated points for use in later computations.

We use the term "Selection Set" to refer to a collection of sightings (typically stored as an array of indices or references to sighting records) where any ordering of the sightings in the collection and any duplication has no significance. Thus the set may be stored in ordered or unordered formats, with or without duplicates, depending on the operations to be performed upon it.

Selection of sightings by the user or by application software can be done in several ways.

One way to select sightings is simply by the sequence number of the sighting within the set of loaded sightings. This is useful for stepping through the sightings one by one, or defining a range of sightings in time.

Another way to select sightings is by the time and date of the sightings, typically choosing the sighting nearest to the midpoint of the day or time given, or the range of sightings between two such days and times. Alternatively, sightings can be selected by a range of time that repeats on a daily, weekly or yearly basis. For example, all sightings made between 9 am and 10 am, Monday to Friday.

Then there is the use of positions to select the sightings. These positions may come from other software, or may be defined by the screen position of the mouse when a button is clicked or held down. Useful position selection modes are to find the nearest sighting (in position) to a supplied position, or all sightings within some area around a supplied position (square or circular), or the earliest or latest sighting within some area around a supplied position. When the user is supplying positions by clicking and dragging the mouse, it is helpful to draw a cursor around the mouse pointer that represents the region within which points are being selected.

In all of the above selection modes, particularly where the selected points are being picked by the user, it is often useful to highlight on the display the points that are in the selection set. Alternatively, for some functions such as journey analysis, it can be useful to highlight more than just the immediately selected set, such as all journeys of which the selected sightings are a part. Such highlighting modes are typically controlled in a graphical user interface by a button on a pull-down menu or toolbar.

All of the selection methods can be set to define a new set of points each time they are applied, or they can be set to accumulate points over a number of independent applications.

Once some points are selected, there is a set of corresponding operations to delete points from a selection set. These deletion operations use the same selection criteria to define a new set of points (the deletion points). Any of the original set of points that are also included in the deletion set are then removed from the original set. One convenient way to use this is to activate the cumulative selection function from the left mouse button, and the deletion function from the right mouse button. Then large ranges of points can be selected by sweeping the mouse across the display while holding down the left mouse button, and any points accidentally included can be deleted by moving the mouse cursor over them while holding down the right mouse button.

Once a set of sightings has been defined by selection, there are many cases in which the set should be saved for later use, perhaps as the set of sightings from which to start or end searches, prediction or other algorithms. To make subsequent operations easier, when the selection set is saved, the references to the sightings are sorted into a unique order (for example, by the index of the sighting in the time-ordered list of all sightings), and any duplicates are eliminated. This list is then available for other software to copy and manipulate, perhaps at the command of the user to set start or end points for searches, analyse times and duration, speeds or any other properties that can be derived from a set of sightings.

Where multiple selection sets are being used, it is often advantageous to be able to manipulate whole sets in one operation. A common example is where start and end point sets are being used. Suppose we have a set of all points in London defined as the start points, and a set of all points in Cambridge defined as the end points. If we find the closest pair of points (in time) where the first is from the start point set, and the second is from the end point set, then we have found the start and end points of the fastest traversal (not necessarily in one journey) from any point in the start point set to any point in the end point set, which is the fastest traversal that we have made from London to Cambridge. A reverse button swaps the names of the two sets so that the points that made up the start point set now make up the end point set and vice versa. If the analysis is repeated, it now finds the fastest traversal from Cambridge to London, without the user having to reselect the sets of points.

Simple searches include looking up all the sightings within a certain range of times, or close to some location. Both of these activities could be performed by examining each sighting in turn, keeping those that met the criterion.

A more efficient way of doing this is to create segment records for consecutive runs of sightings, perhaps one thousand at a time (about 16 minutes at one sighting per second), where each segment record refers to the first and last sighting in the sequence, and contains the result of computing the minimum bounding box in latitude and longitude within which all the sightings lie. This segment record is typically identical in structure to the records used to describe journeys above, and is also used in other places where inclusive ranges of points are required. By always having the bounding box ready, any computations of overlap by spatial coordinates can be accelerated by first computing the region of overlap of the bounding boxes. A good example of this is where segments are being considered for display, where they can be quickly rejected if their bounding box does not overlap the bounding box of the displayed area. Similarly, any overlap in time can quickly be determined by considering the times of the first and last sighting referred to by the segment.

Adding the segment records allows us to more efficiently answer some forms of query. For example, what are the locations of sightings within a given time range, and what are the times of sightings within a given area, typically circular or square, around a given location?

These queries themselves can be used to answer higher level queries. An example would be to find the sightings that were made around the time that a digital photograph was taken. This time is often stored with the photograph, either within the image format, or as a file creation time. It is a straightforward matter to find the sightings immediately before and after the photograph, and to present these to the user, perhaps as highlights over a map display, so that they can see where the vehicle, cellphone or other tracked object was at the time that the photograph was taken.

One could also display the locations of all photographs on a map as highlighted points, keeping a record of which photograph had given rise to the highlighting of each point. This is done by highlighting the sightings that were made just before and after each photograph was taken. One could then allow the user to select such a highlighted location, and then the associated photograph could be displayed. In this way, photographs could be browsed by location even though the camera and photographs themselves do not contain any location information.

The location derived from the time of a photograph could also be used to find all the times in the database of sightings at which the vehicle or other tracked object was in the vicinity of that location. Those times could then be used to find other photographs or information such as diary entries that might be relevant.

Figure 6:
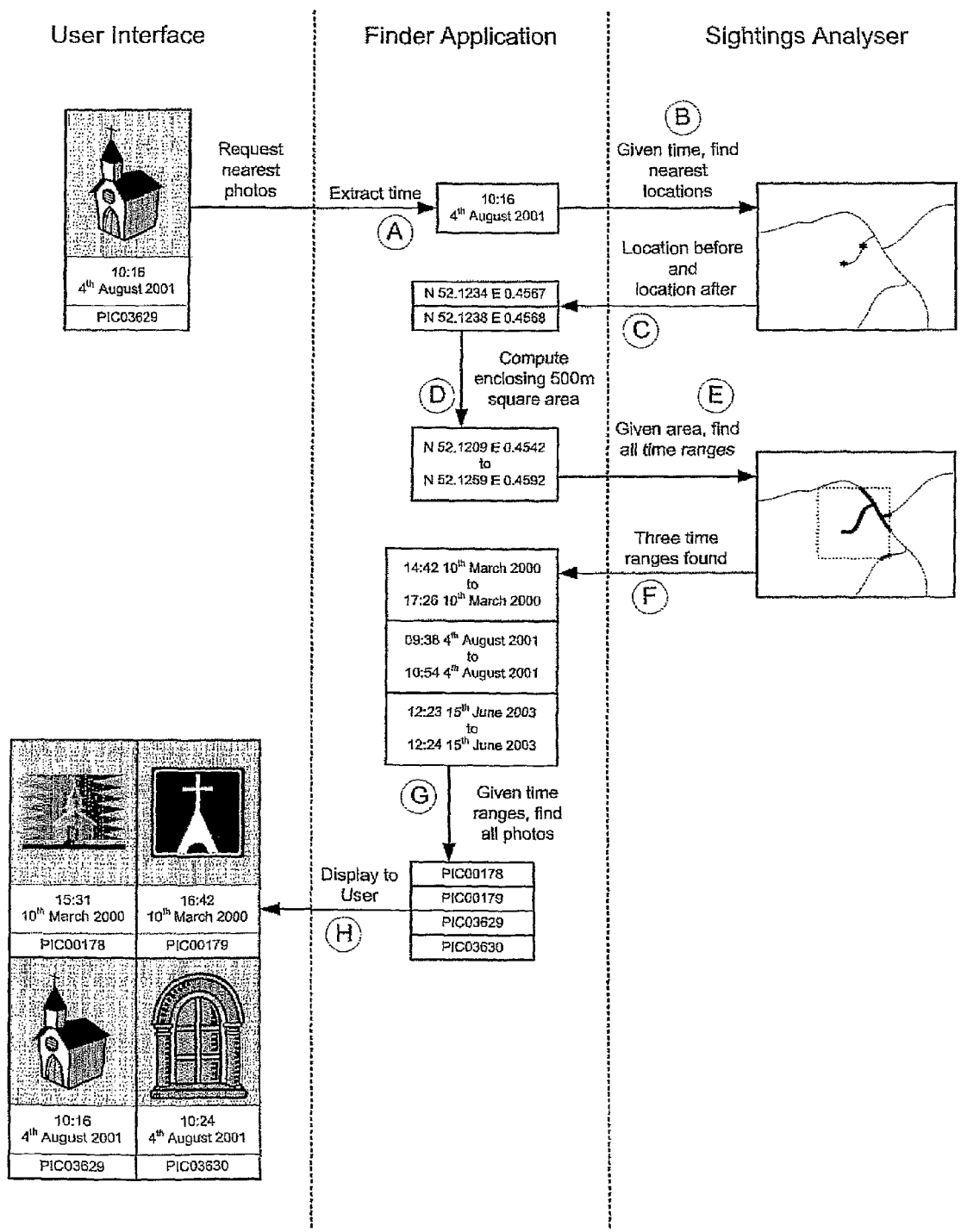
FIG. 6 is a flow chart showing the sequence of operations involved in photo correlation.

An example of the sequence of operations involved in photo correlation is shown in FIG. 6. The system has been divided into three sections:
 the User Interface that reflects what the user sees and interacts with,
 the Finder Application that implements the detailed operation of the correlation,
 the Sightings Analyser that allows the Finder to interact with the sightings database.

The first operation is at (A) where the user selects a photograph and activates the Finder Application to find other photos that may have been taken at the same location. The finder application extracts the time from the photograph file, for example, from the time record kept in the commonly used JPEG format. This time is then passed at (B) to the Sightings Analyser which searches through its time-ordered list and returns at (C) the locations of the sightings immediately preceding and succeeding the given time. At (D), the Finder Application then takes a point midway between the two sightings, and constructs a square area centred on it, with 500 m on a side. This area takes account of errors in the positioning system, ensures that previous or subsequent visits where a vehicle might have been parked in a different place are encompassed, and allows for gaps in the sightings record that might be caused by obstructions such as trees or buildings. This area is given to the Sightings Analyser at (E), which selects all sightings that lie within that square. It then looks for time sequences of sightings in that selection that all lie within the square, and returns the start and end time of each such sequence at (F). The Finder Application now looks through all photographs (or other timestamped media), and selects any whose timestamp is inside any of the time ranges, producing a list of such media at (G). The user interface is then called at (H) to present this list to the user, perhaps as filenames, thumbnails, or a slideshow.

A further improvement would be to begin with a square of side say 500 m at (D), but if only a few photographs were found, perhaps less than ten, then we try again with the area expanded to have 1 km on a side, then 2 km, then 5 km until we find the closest ten or so photographs for presentation to the user.

Amongst other alternatives, the area at (D) could be circular, rectangular or ellipsoidal with foci on the two original locations from (C). An efficient alternative would be to use two 500 m squares, one centred on each location given at (C), and to combine the sightings before extracting the time ranges.

If the user can describe a location by giving the time at which sightings would have been made there, or by selecting on a map, or by giving coordinates, or by giving an address or placename whose location can be looked up; then we can use that location as the origin of the search and find all sightings in the vicinity, then find the time ranges that they cover, and then find all photographs that were taken within those time ranges.

Similar processes can be applied to a computerised diary application. If a past entry says "visit Acme Ltd" at some particular time, then we can again find the sightings that were made around that time. These can be used in the same way as the photographic example to find other times in the past when sightings were made in that vicinity, and the dates can be highlighted to the user in a calendar, or the user can be taken one-by-one to the relevant diary pages. Even though the system has not necessarily been told where "Acme Ltd" is located, it has been able to infer this from the sightings made at the time of the appointment and extract other likely times that the same company was visited.

Figure 7:
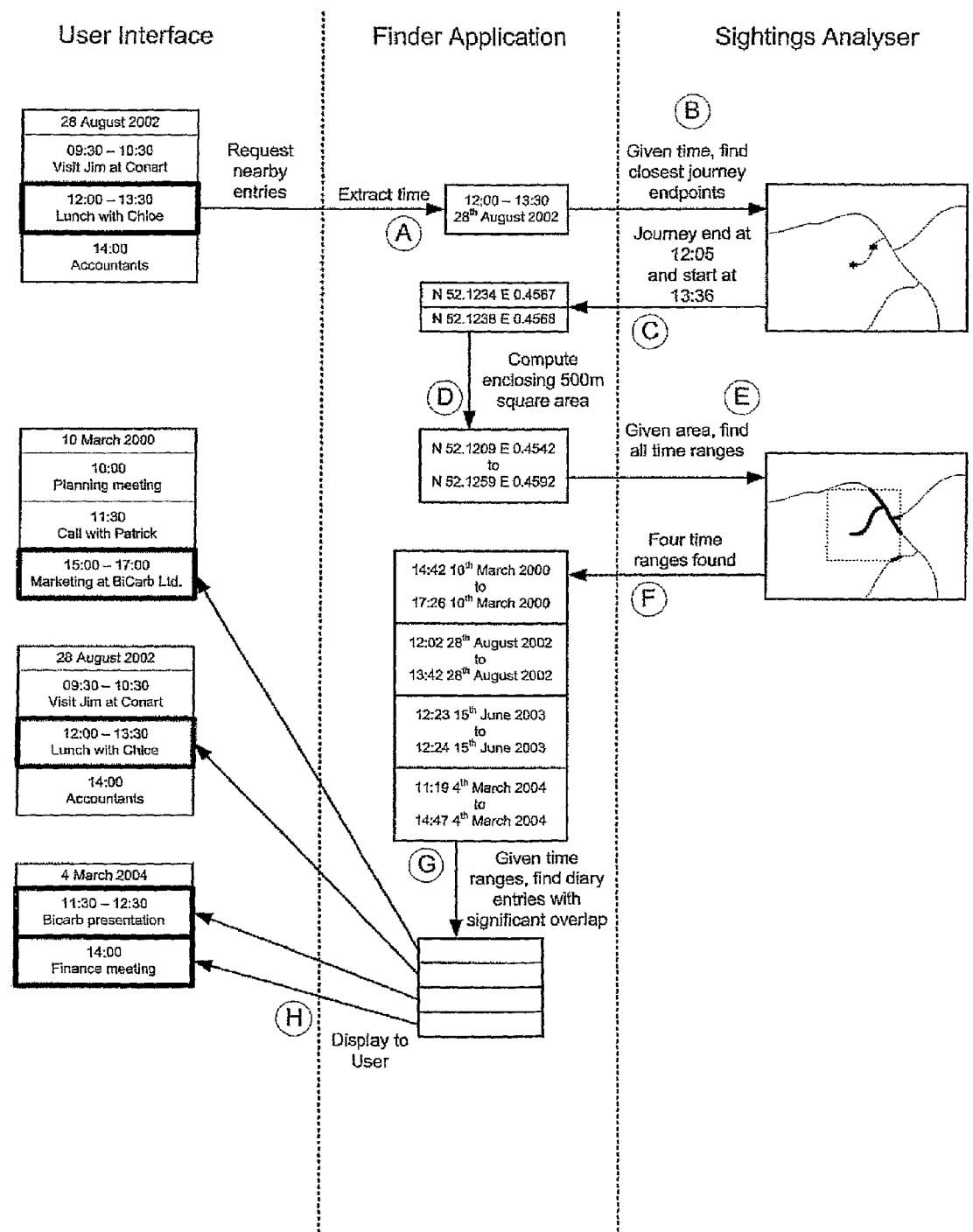
FIG. 7 is a flow chart showing the sequence of operations involved in diary Correlation.

The diary process is shown in detail in FIG. 7. The user begins by selecting a diary entry that defines a time or time range in which they are interested. We again extract the time at (A) and pass this to the Sightings Analyser. Where the photo example used a single time, the diary example is typically looking at events that are spread out over a period, so that period will be given to the Sightings Analyser (SA). The SA could now find all sightings from the one just before the time period to the one just after, but there is another difference from the photo example here: the user might not have been at that appointment at exactly the times shown in the diary. In particular, they might have arrived late and possibly left early. Thus the retrieval of all sightings for that time range could easily include a substantial part of the journey to or from the appointment, which would blunt the accuracy of the location. Instead, we could look through our list of journey segments, to find the journey segment or break period that was in progress at the appointment start time. We then use the end of the journey, or the beginning of the break, respectively, as the first probable location. Similarly for the end of the appointment, we use the beginning of the overlapping journey, or the end of the overlapping break (which is also the beginning of the succeeding journey), as the last probable location. If there are other journeys covering the diary period, then we could add their beginning and end points into the location list, or we could raise an exception and ask the user to be more specific about the time, for example, by nominating the beginning or end of the appointment.

We return the location list at (C). The Finder Application at (D) then computes one or more enclosing areas as in the photo example, and requests all time ranges at (E) from the SA. The SA returns the relevant time ranges at (F), and the Finder Application compares each of these with the time spans of all of the diary entries, and returns all diary entries with any overlap with any of the time spans. Another difference to the photo application is that a small overlap in time with a longer diary entry is probably not significant. In this example, on 15 Jun. 2003, the user may have been driving past the location of the original diary entry but was only in that vicinity for two minutes (12:23 to 12:24). There is clearly little chance that the user was visiting the same place, otherwise they would have been in that vicinity for longer, so we ignore that time range. Typically, we would ignore time ranges of less than five minutes, and overlaps of less than one quarter of the period of the overlapping diary entry. We then take the remaining diary entries at (H) and display them to the user, perhaps highlighted on a calendar, or as a sequence of day pages with highlighting as shown in FIG. 7, or as a list of diary entries with dates.

These processes do not have to be 100% correct. So long as they yield a suitably high proportion of useful hits to the user, the few photos presented that were not taken at the same location, or diary times when different places were being visited will be forgiven in much the way that internet search engines can be forgiven for producing a few hits that are not relevant to the query that the user was making.

The partitioning of the whole sequence of sightings into journeys gives us a further efficient query mechanism: Where and when were there breaks in the journeys? Once the journey start and end points are known, then this can be refined to include location, time of day etc. For example, if we wanted to find the places in the North of England where we might have stopped for lunch, we could search through all the journey end points for breaks (stops) of more than half an hour in a certain bounding box of latitude and longitude encompassing the North of England, between the hours of 12 midday and 2 pm. This would immediately present us with the possibilities, which could be displayed on a map, or translated to text by looking up nearby places.

Another useful analysis is to find all the sequences of sightings where the vehicle has passed from one set of points to another without a break of journey. Firstly, the user makes a selection of points by any of the means described above. This set of points is used as the start points. The user can then select another set of points, to be recorded as the end points. The program then effectively searches all the sightings in the full sequence from the very earliest to the very latest looking for any instances of a start point being followed in the same journey by an end point before encountering any other start points.

Each pair of such <start,end> points is then stored (as a segment), and the search returns to looking for a start point. Once all the sightings have been considered, we have a list of segments of journeys that moved between the start and end points.

We say effectively, because this search can be performed using only the indices of points stored as the start and end point sets, and the journey segments. All of the point index lists are first sorted into ascending order. There is no requirement to consider all of the intermediate sightings for this algorithm, it simply involves walking through the ordered lists of indices of the start and end points, and all of the journey start and end points, so it is highly efficient in time and can be applied to collections of many millions of points.

Each segment is then analysed to compute its duration, length and time of travel, and this data is displayed to the user in a text box, with one segment per line. These lines can be sorted into order of increasing duration or increasing date so that the user can see at a glance how often they have traveled between those points and how fast or slow the journeys were. For example, if different routes have been used, it will be immediately apparent which were the faster routes as they will be at the head of the table when it is sorted by duration.

Figure 8:
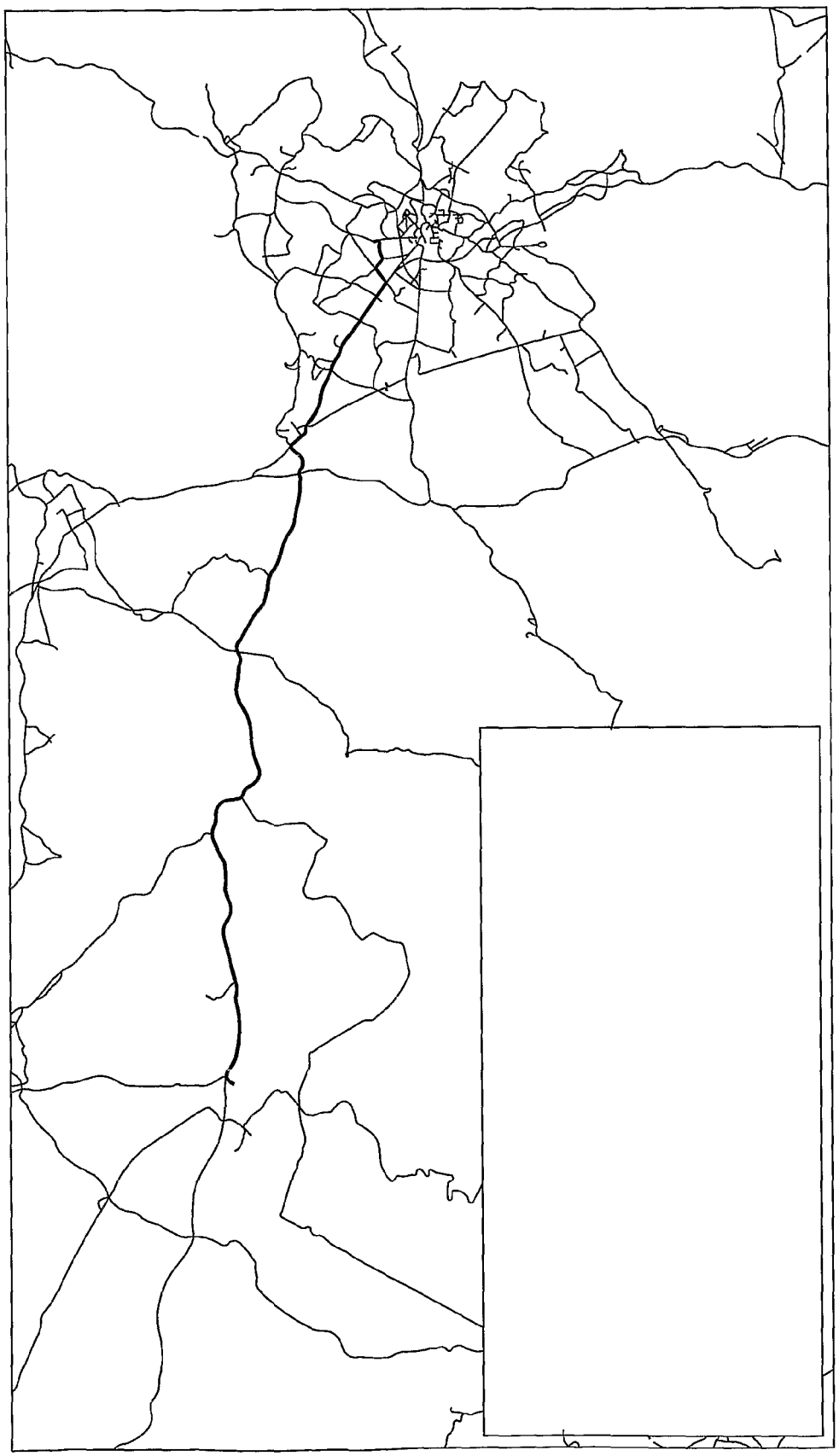
FIG. 8 is a map showing journeys highlighted in response to user selection.

An additional refinement allows the user to select a line or lines in this text box and see those particular segments and the journeys that contain them highlighted on the display. An instance of such a selection is shown in FIG. 8. For example, we use green highlighting for the parts of each journey that come before the start point of the segment, yellow for the portion between the start point and the end point of the segment, and red for the portion of each journey from the end point of the segment to the end point of the journey. In this way the user can easily see the routes that were used on the occasions of the quickest and slowest times that they traversed between the points, and also where the journeys started and ended.

A conventional route planning tool typically allows the user to select a start-of-route location, and an end-of-route location. The sets of start and end points for our tools can be generated automatically by finding all of the points within a certain range (typically 100 m) from the start-of-route and end-of-route locations respectively. The data extracted from the recorded journeys can then be compared with the routes and durations predicted by the route planning tool. If the route planning tool also has locations set as "vias" or "stops" that the route must pass through in order, then we can also generate extra sets of points through which our selected route segments must pass.

The route planning tool can be made more accurate by considering each road link in its database (with its associated end locations and speed information), and performing this analysis to find journeys that traverse that link. This can be done by setting start points within some range (typically 100 m) of one end of the link and end points within the same range of the other end of the link, finding all possible journey segments as above, then retaining only those where the distance traveled is within some margin (typically 20%) of the length of the road link.

To make sure that junction delays are only considered once, they should be added to the beginning or the end of traversals, but not both. To add the junction delays to the end of each traversal, we take the start time of the traversal as the earliest time that the vicinity of the beginning of the link was left, and the end time of the traversal as the earliest time that the vicinity of the end of the link was left, or the end of the journey if that occurs first.

The duration of each traversal can then be used to update the road link speeds for the time of day and day of week of that traversal.

In this way, the route planning tool will better reflect the particular driving styles of the user. If several traversals are found for the same road link at similar times of day and days of week, then the earlier ones can be discounted, so that the system will gradually adapt to changes in driving style or road conditions.

The variations in the durations of the traversals can also be used to estimate the variability of the link, for example by computing the standard deviation and variance of the traversal durations, and the variances can be summed along a whole route to give an estimate of the variance to be expected in the complete journey time. The square root of this variance gives an estimate of the standard deviation to be expected in the complete journey time. The route planner could be configured to present the route whose pessimistic time is the best by including one or two standard deviations in each estimated route time, and selecting the lowest. Alternatively, it could be configured to give the route whose average time is the best by summing durations without including the variances, and selecting the lowest.

The route planning tools can also note for each road link how frequently (and recently) it has been traveled, so that those links can be given priority if the user chooses what could be called a "Most Familiar" option rather than usual "Shortest Distance", "Most use of Motorways" or "Quickest". Indeed, there could even be an option "Less Familiar" or "Surprise Me" that weighted against the use of road links that the user had recently traveled. Such techniques are described in more detail as follows:

Most route-planning systems for vehicles use a database that contains entries for junctions and the road segments between them. In some implementations of route planners, the junctions or road segments are implicitly present as pointers in a data structure that describes the connectivity between them, and sometimes they are explicit data objects, containing information such as names, location coordinates, and road or junction types. In some cases, the ends of road segments may not be junctions, for example, where a road is a dead end. To cover such cases, we shall use the term "point", in the context of route planning, to mean the end of a road segment. It will be appreciated that a road segment connects two points, and that a point may have (a) one, (b) two or (c) more than two road segments connected to it, according to whether it is for example (a) a dead end, (b) a corner or other significant point in a road, or (c) a junction, respectively. Further data encodes restrictions such as one-way streets or forbidden turns.

A single-pair route planner is a piece of software that uses this roads database to plan an optimum journey (under given criteria) from one location in that database to another, that is, from point A to point B. A single-source route planner plans optimum journeys from a point A to all other points in the database. An all-pairs route planner plans optimum journeys from all points in the database to all others. Different algorithms have been devised for each of these problems, but they can mostly be modified in the ways described below to take account of familiarity. We shall concentrate on the single-pair route planner as that is the most commonly used in vehicle applications, but it should be appreciated that the techniques are applicable to a much wider range of problems.

Most of these algorithms are not restricted to use on road networks, but usually operate on any network that can be expressed as a directed graph with incremental costs associated with the use of each link in the graph. They are often called "shortest path" algorithms, although the costs may have nothing to do with real path lengths, but are just abstract costs. The graphs are usually constrained to have no cycles in the graph whose overall cost is negative; otherwise a shortest path would involve an infinite number of trips around such a cycle. The present technique will be described in the context of route planners for road networks, but it should be appreciated that it can be applied to many other networks in the same ways.

Typically, there will be many possible routes, and so a search has to be made to find the one which is optimum under the given criteria. The parameters that govern that choice are typically some combination of the overall journey time, the type of roads traversed, the length of the journey, or the fuel cost of the journey. These are usually expressed as a linear cost function that operates incrementally for each road segment. This is not a monetary cost, but an abstract cost that reflects the relative weightings of the different types of preference parameters. That is, the cost function can compute the incremental abstract cost (in terms of time, type, length and fuel cost) of adding a particular road segment to the route. Given this cost function, then there are well known algorithms for finding the route from A to B that has the lowest overall cost. Users of the route planner are often given the opportunity to vary the weightings of these factors in the cost function according to their own preferences, so that the route will be optimum for some of those factors and not necessarily for others.

In some systems, the cost of a given segment of road may be time dependent. For example, the time taken to traverse a segment may be longer in the rush hour than at other times of day, so the cost function is dependent on the time at which the vehicle is expected to traverse each road segment.

In some systems, the overall cost function may not be a linear combination of the costs of the individual road segments. This can make the route-finding algorithm more complex or time-consuming, but many basic parameters such as time to traverse a road segment or the incremental fuel cost are still given for each road segment.

Below, we show how familiarity can be added as a parameter to each road segment, and how it can be incorporated into the overall cost function to provide new route-finding capabilities.

A new element is introduced into the cost function used by the route planner which represents how familiar (or unfamiliar) the driver is likely to be with each road segment. This element would not typically be used on its own, but would vary the cost of each road segment as computed above by perhaps a further 10% or 20%. Thus if we deemed a segment to be quite familiar, we would reduce its cost by 20%, and slightly familiar, by 10%. If the user had asked for unfamiliar routes, then we would increase the cost of a segment with which they were slightly familiar by 10%, and one with which they were very familiar by 20%. Of course, these values are typical examples and could be chosen differently according to how much influence we would like familiarity to have. Usually a system would provide the user with a means of configuring the level of familiarity, perhaps on a spectrum from "very unfamiliar" (40% maximum increase in cost), through "unfamiliar" (20% maximum increase), to "slightly unfamiliar" (10% maximum increase), to "don't care" (no change in costs), to "slightly familiar (10% maximum decrease in costs), to "familiar" (20% maximum decrease in costs), to "very familiar" (40% maximum decrease in costs).

Familiar routes should be safer because the driver is familiar with what may be coming up in terms of junction layout, which lanes to be in, narrow lanes, severity of turns, pedestrian crossings etc.

Familiar routes are often used because they are preferred for reasons that are not encoded in the roads database, for example, because some roads become dangerous when it rains, or icy, or are more relaxing, or less polluted, or pass a useful stopping place. The concept of familiarity helps to optimise route planning to take account of these and many other personal preferences without them having to be explicitly programmed.

Sometimes a conventional route planner just does not know the roads and the traffic as well as the driver, and plans a route that the driver knows is not optimum in some places. The driver may then add extra waypoints to the route, which it must pass through. These are sometimes called "vias". Once sufficient vias have been placed, this should force the route planner to go the way that the driver wishes. Forcing particular routes in this way is annoying on a desktop route planner, but at least the whole route can be seen graphically, vias can be placed along the preferred route by using the mouse, and the new route can be verified by displaying it at high resolution over a map. In a vehicle based system with its limited display and input means, this becomes a very difficult task indeed, and familiar routing becomes especially attractive.

Weighting route selection in favour of the use of an "unfamiliar" route may be of advantage when it is known that the familiar route has a problem and it is wished to see whether there is another good route that has not been used recently. It may also be used when a driver, for example, is fed up with using the same route and wants to try a different route to see whether it is better. Weighting route selection in favour of the use of an unfamiliar route could also be used when on holiday, as each time a different route was used it would become more familiar, and so become less likely to be chosen again if route selection was weighted in favour of the use of an unfamiliar route. Thus in a series of journeys from A to B, the routing engine might suggest a different unfamiliar route each day, and one would see more of the surrounding area.

The familiarity level for each road segment can be coded without loss of generality as a real number between 0 (for never traveled) and 1 (as familiar as we can represent). Its interpretation will be governed by the way in which it weights the cost function. It could be set by the user selecting road segments or sets of road segments by name or location with some textual or graphical tool. Alternatively, if the paths followed by the vehicle in the past are available in some form, then the familiarity level could be computed from them.

The familiarity level for each road segment may take account of how often that road segment has previously been used. Additionally or alternatively, the familiarity level for each road segment may take account of how recently that road segment has been used.

Typically, each portion of the network has an associated cost function used by the route selection process. The method may comprise varying the cost function associated with a selected portion of the network on the basis of previous usage of the selected portion of the network.

The route selection may give preference to the use of road segments that have been used before over road segments that have not been used before (or, more generally, may give preference to the use of road segments with a high level of familiarity over road segments with a low level of familiarity). Alternatively, the route selection may give preference to the use of road segments that have not been used before over road segments that have been used before (or, more generally, may give preference to the use of road segments with a low level of familiarity over road segments with a high level of familiarity).

The travel that is taken into account could be all of the journeys made by a particular vehicle, or by a particular set of vehicles (for example a fleet of delivery vehicles), by a particular driver (for example identified by the security code of their car keys, or by the memory seat setting where fitted), or by a particular set of drivers (for example those working for a particular company, or belonging to a family).

This method may be performed by an apparatus arranged to move with the object whose route is to be determined, for example by an in-vehicle apparatus. In this case, the apparatus may include a satellite navigation system, to enable the position of the object to be determined in real time.

In some implementations, familiarity levels would be continuously maintained by incrementally providing data about which road segments had been recently traversed, for example from a map matching navigation system, or by matching a sequence of position coordinates against a road segment database. As each new traversal was identified, the familiarity level for that road segment would be altered accordingly.

For example, we could compute the familiarity by counting how many times the driver had traversed a particular road segment in a particular direction, and then dividing by ten and capping at 1. That would give us the desired range for the familiarity level from 0 to 1. To take account of how recently the traversals had been made, we could count traversals made in the last month as one mark each, and reduce the total marks (the count) by 2% for each extra month since the traversal was made. This use of an exponential decay with time has an elegant implementation, in that each segment has only to store the count (e.g. 4.5) and the date on which it had that value (say 5 Jan. 2001). Then if we are computing a route for a day that is m months later (say five months later) and the driver has not made any further traversals of that segment, we multiply the 4.5 by (0.98 raised to the power m) to get the new count, and write back that the count was in this case 4.5*0.922=4.15 on 5 Jun. 2001. This is because each element that has made up the count of 4.5 will be decaying at the same rate each month, so their sum will also decay at that rate.

Of course, to smooth the decay, we would in fact use a continuous measure of the decay which is expressed in whatever units (seconds or milliseconds) are being used for our times, and use real exponentiation to compute the correct decay factor for any elapsed time interval. If the driver makes a traversal of a road segment, then we first compute the count at the time of the new traversal by the exponentiation process just described, then add 1 mark, and then store that as the new count just after the time of the new traversal.

To prevent very familiar routes from becoming too dominant, we may cap the count if it exceeds some fixed value, for example ten, and then divide it by that value to get the familiarity index in the range 0 to 1.

If we wanted traversals older than some time interval (say ten years) to have no influence on the routing, then an alternative implementation could calculate (0.1 times the length of time in years since the traversal), and subtract this from one, with anything less than zero being counted as zero. That way, a traversal one year in the past would only count an extra 0.9 marks, and a traversal nine years in the past would count an extra 0.1 marks. This is effectively a linear decay with age from 1 when fresh, down to zero when exactly ten years old, and would typically be implemented by a smooth decay function expressed in the units being used for the storage of the times, for example seconds or milliseconds. In this case, the data stored with each segment would be greater. The reason is that the points from each past traversal do not decay at the same rate. Rather, they decay by a constant amount per time interval until they reach ten years old, at which time they have reached zero marks and do not decay any further. This means that an aggregated marks total cannot be aged in the simple way that the exponential decay total can, because we need to record separately when each contributor is going to reach ten years old and no longer decay. Instead, we could store the time of each past traversal until they reach ten years old, at which time they can be permanently deleted. We can then compute the points total whenever required from the given times. Again, we could cap the points total at ten and divide by ten to get the familiarity index. If we find that a road segment no longer has any traversals marked that are younger than ten years old, then we can remove the list from that segment altogether and it is just as if no traversals had ever been made.

Once we have computed the familiarity level for the time that the route is going to use a road segment, call it F, then we use that to weight the cost function. For example, if we have a cost function that represents the expected increment in journey time when a road segment is traversed, and is expressed as T seconds, then we could multiply that by (1−0.2*F) so that a road segment with a familiarity index of 1 (very high) would be counted as if it were a road segment that is 20% faster, and takes only 0.8T to traverse, while one with a familiarity index of 0.2 (quite small) would be counted as 4% faster, taking 0.96T to traverse. Of course, these artificially reduced traversal times would only be used to decide which route was best overall. The user would be told the true sum of the traversal times of the route with the lowest cost function, as that is the actual time the journey is expected to take. If familiar routing is used, the route with the lowest overall cost function may not be the shortest in journey time, just as the preferences for lowest cost, preferred use of motorways etc. may not yield the quickest routes either.

There are many known algorithms for single-pair route planners that work with incremental cost functions as described above. Some of these take good advantage of extra knowledge about road networks such as the fact that no route can be shorter than the straight-line distance between any pair of points. For example, "Dijkstra's Algorithm" is a well-known method of finding the optimum routes from one point in a graph to all other points with very few constraints. When applied to roads, which cannot have negative lengths or traversal times, special termination checks can be added that stop it when the optimum route to one selected point has been determined.

Another class of router is similar to a "Lee Router" as described in

C. Y. Lee, "An Algorithm for Path Connectivity and its Applications,"
*IRE Trans. on Electronic Computers*, Vol. 10, No. 3, September 1961, pp. 346-365.

To show how familiarity can be added to routers such as these, we will firstly describe the operation of a simple router, then show how familiarity is added as a parameter. Then we will describe a typical optimisation that can be added to the router, and show how it can also be adapted to incorporate familiarity. This is all by way of an example to show how familiarity can be added to almost any router using these techniques.

Our example router can be used to find the route with the quickest expected journey time from any given point A to any other given point B. We will describe it in outline as Algorithm A1, and then describe an additional important and well-known optimisation in Algorithm A2 so that we can show how familiarity can still be incorporated in the improved router.

Algorithm A1

This router begins by examining all the road segments that emanate from the starting point (point A), noting the earliest time at which the point at the other end of each segment can be reached. Call this the earliest known time of arrival (time Te) at that point. We also note for each point whether or not it is waiting to be expanded, with all points initially being set to be waiting, except for point B, which is never expanded. The starting point (point A) is then marked as NOT waiting to be expanded. The next step shall be called step S. At step S, the router examines the points for which an earliest known time of arrival (time Ta) is known, and which are waiting to be expanded. It then finds the point with the earliest such time, call this point P. This step is usually made more efficient by maintaining an ordered list of points that are waiting to be expanded and their earliest known times of arrival Te, that list being sorted into order of increasing Te. The router then examines each of the road segments emanating from point P in turn, and for each independently, it computes the expected time of arrival (Tc) at their other end (point Q) by adding the traversal time for the road segment P to Q (call this Tpq) to the earliest known time of arrival (time Te) at point P. Thus Tc=Tpq+Te. If there is not an earliest known time of arrival stored for the point Q at the other end, or if that stored time is greater than the computed time Tc, then the earliest known time of arrival stored for point Q is made equal to Tc, and the point Q is marked as waiting to be expanded. Note that in some circumstances, Q can have been marked as NOT waiting to be expanded by an earlier iteration, but when an earlier known time of arrival is found for it, it will be marked as waiting to be expanded again. The algorithm then repeats from step S.

The algorithm terminates when the end point (point B) has been labelled with an earliest known arrival time (Te), and all other points which are marked as waiting to be expanded have values of Te that are greater than the one for point B. This condition is checked at step S, and again benefits from the maintenance of an ordered list of points that are waiting to be expanded and their earliest known times of arrival Te, that list being sorted into order of increasing Te.

To incorporate familiarity, it is sufficient to alter the traversal times of the road segments by a percentage that is dependent on familiarity as already described. This will effectively turn the traversal times into an abstract cost function that is dependent on both traversal time and familiarity. The algorithm will then present a route which is optimum for this combination of overall journey time and familiarity. That means that it may not be the quickest route between A and B, but will be more familiar that the quickest route, and will not be hugely longer in terms of overall travel time. Of course, the earliest arrival times Te computed from the traversal times that were modified by familiarity will not now be true times. If the output of the route planner includes traversal or overall times, then the unmodified times should be used to derive these once the optimum route has been found from the modified traversal times.

Upon termination, the minimum time route can be found by tracing back from the point B along each road segment where Te decreases and where the difference in Te between the two ends (Te for point Q minus Te for point P) is equal (within the known arithmetic error) to the traversal time for that segment in the direction from P to Q. In this way, Te will decrease until we reach point A, when we terminate the traceback. We have ensured that the sum of the traversal times in the traceback is equal (within the small margin of arithmetic error) to the sum of the differences in Te, which is therefore the earliest time of arrival at point B minus the starting time from point A, and thus the traceback path must be the fastest route from A to B.

An alternative for the traceback if the arithmetic errors are difficult to quantify is that every time a new value of Te is stored for a point Q, the index of the point P whose expansion caused that value to be changed is stored with Q. Now, after termination, point B will have such an index indicating the previous point in the route. That point in its turn will indicate the previous point to it, and so on until we reach point A, at which time we have again reconstructed the whole route.

This algorithm can be used with any positive-valued cost function instead of time, in which case each road segment is labelled with the cost increment for using it, and the resulting route is the route of minimum cost between point A and point B. The cost on some road segments can even be negative so long as there are no cycles possible in the road network whose total cost is negative.

When viewed geographically, the set of points which are waiting to be expanded tends to be (very roughly) a circle centred on the starting point A, whose radius expands roughly equally in all directions. This means that by the time the termination condition is met, much computation time has been spent on road segments that lie on the opposite side of A from B, which in most cases, is wasted effort, but just might hit a direct road to B that is unusually fast.

Algorithm A2

A common optimisation of this router that helps avoid such wasted computation, is that at step S, we find the point P which has the lowest value of (Te+Tz) where Tz is the time that it would take to get from point P to the end point B in a straight line at the speed of the fastest road segment in the database. This means that each point must have its geographical coordinates known so that we can compute the straight-line distances, and that we must have previously found the highest traversal speed of any road segment in the database. For best results, this maximum traversal speed should be computed from the straight line distance between the end points of each road segment divided by the given traversal time for that road segment. Again, we make this more efficient by maintaining a list of points that are waiting to be expanded and keeping it ordered by the values of (Te+Tz).

Now when viewed geographically, the set of points that are waiting to be expanded tends to be roughly an ellipse with one focus on point A and which extends more towards point B than away from it depending on the average speed of the roads compared to the highest computed speed. The end condition is now that the value of (Te+Tz) for any point waiting to be expanded must be greater than the earliest time of arrival (Te) found for point B. When the end condition is met, the set of points that have been expanded should be much smaller that in the non-optimised ink-blot router, so the optimised router should run much faster and consume less power.

Now, if we wish to use familiarity as an additional cost factor in this optimised algorithm, we simply modify the traversal times for each road segment by reducing them by a percentage dependent on the familiarity level as described earlier. However, in the case of the optimised algorithm A2, we must also determine the maximum modified traversal speed for any road segment in the database by taking the straight line distance between the end points of each road segment and dividing it by the modified traversal time for that road segment. This will tend, if anything, to give us a higher maximum speed than in the unmodified case, and the algorithm will tend to explore slightly more points than without this familiarity weighting.

In the case where we are looking for unfamiliar routes, we use the familiarity level to artificially increase the traversal times by some percentage, which will tend, if anything, to reduce the maximum speed encountered on any road segment. Thus this could make the optimised algorithm slightly faster.

It should be appreciated that there are many other variations in routing algorithms, for example involving precomputation, or handling traversal times that themselves vary with time (e.g. time of day). In ways similar to those described for algorithm A2, familiarity can be taken into account in many of them, but care must be taken to modify not only the cost function but also to consider modifying any other assumptions that the router relies upon.

Routers that adapt to familiarity in this way can be substituted for existing applications of routers in most cases. For example, in-vehicle navigation systems are used to compute a route to a given destination, or to dynamically recalculate a least-cost route, or even to calculate a least-cost route visiting several points, not necessarily in order (e.g. the travelling salesman problem). All of these routers can be improved for some classes of driver by the adaptation of their cost functions according to familiarity derived by observing on-board which road segments have been traversed and possibly when.

Similarly, centralised route planning for fleet users often have incoming feeds (live or in batches) of where the fleet vehicles are travelling, and again, these can be used to add familiarity into the cost function. Even if the vehicles are not reporting in with their positions, the routes that were sent out to them can be used as a strong hint that the road segments on those routes were the ones that were used, and again, the familiarity levels can be computed. If the fleet managers perform optimisations across their whole fleet and delivery schedule, the incorporation of familiarity for each driver could help to ensure that where possible, drivers are assigned to routes that they know. The option of least familiarity or manual settings of familiarity could be used when drivers were wishing to learn new routes, perhaps at times of least traffic or when the delivery schedules were not so tight.

Desktop or PDA-based route planners are becoming very popular, and would also benefit greatly from familiar routing. Here, the manual entry of familiarity could be used, and perhaps enhanced by setting whole areas or complete roads as familiar. Better still, there are a growing number of specially modified vehicles that can store records of where they have been and make this available in real-time or in batches later to such devices, either by transfer over a communications link such as Wi-Fi, GSM data or GPRS, or on some removable memory media such as CompactFlash or SD Memory.

These are examples of where routing algorithms are used, but the technique can be applied to any router where information on familiarity can be made available.

Here we give two examples of how road segment traversal information can be obtained.

Matching Sightings Histories

One method is based upon keeping a history of sightings (e.g. <latitude, longitude, altitude, time>) of the vehicle in some coordinate system, a common example being the WGS-84 latitude and longitude as used by the majority of GPS satellite positioning receivers. To find out which road segments in the route planning database have been traversed and when, we first take the endpoints of each road segment, and for very long segments, perhaps extra points every 100 m along the road segment, as representative of that segment. For this example, we will select one endpoint and call it P1. We will then select the successive intermediate points in order away from P1 and call them P2, P3 and so on, until we reach the other endpoint which is Pn where n is the total number of points. We then search the history of sightings for close matches to those selected points, perhaps considering every sighting within 50 m of each point to account for the errors in our positioning system (GPS in this example), and selecting the closest sighting to the point in each sequence of sightings, which in most cases will be less than 10 m away. We then see if the sequences of sightings recorded between the matching ones are all remaining close to the road segment itself. We give two methods by which this can be achieved here. A loose matching method compares the cumulative distances between the sequences of points matches to the length of the road segment known from the roads database. If the cumulative distance is within +−10% of the roads database distance, then we accept this as a match. The direction of the traversal is derived from the times of the sightings. That is, if the match for P1 is earlier than the match for Pn, then we have traversed in the direction P1 to Pn, and otherwise in the direction Pn to P1. A tight matching method checks that the sequence of points in the history that lie between the matches for P1 and Pn all lie within some error bound (typically 50 m for GPS-based sightings) of some part of the road segment. This tight matching is best used for long road segments (say longer than 500 m) where their course may have changed significantly if the road layout has been changed, and can identify such deviations even if the overall length of the road segment has not changed significantly.

This matching algorithm can be implemented in a batch mode, perhaps whenever a new mapping database is installed, by running the history of sightings from a vehicle against the new roads database. Similarly, if a sightings history is being moved from one vehicle to another, where those vehicles may have completely different roads databases, then the list of sightings can be matched against the new roads database to determine the familiarity levels.

If real-time sightings are available, then the algorithm can be run as the sightings come in. This time, the position of the latest sighting will be used, and the roads database searched to extract the nearest road to the sighting position. Once this has been done for a series of sightings, then the roads can be compared, and when a sequence of sightings have all matched the same road segment over a sufficiently wide range (say over half its length), we can count one familiarity mark for that road segment in the direction that the sequence of sightings matches most well. We should then make a note that the road segment in that direction is not to be incremented again until we have seen positions at least 50 m away from it for some period (typically ten seconds), to take care that glitches in the positioning system cannot increment the familiarity count more than once while we are still on the same road segment.

Matching Roads Directly

Many navigation systems operate by using the roads database itself as a constraint in a dead-reckoning system. The dead-reckoning is typically performed by using pulses from a vehicle odometer to give the distance traveled, and an angular rate sensor to give the angle of any turns. Other implementations using infrared road surface observation or magnetic compass bearings are also possible. Firstly, those systems need to find the road segment that the vehicle is on, the position along that segment, and the direction of travel. This can be remembered from the last time that the vehicle was moving. In the case where the vehicle is lost they can be derived by taking a short series of GPS position fixes and finding the closest road segments in the roads database to those fixes. The fixes are then examined to see if they all lie within some error margin of each segment (say 50 m). The position along the segment is derived as the closest point in the segment to the latest GPS position, and the direction of travel as the direction along the segment from the closest point in the segment to the earliest GPS position to the closest point in the segment to the latest GPS position. Whichever segment fits best in this analysis is selected as the best. The GPS positions should be taken a few seconds apart when the vehicle is known to be moving from the odometer pulses, and if the matching to a road segment fails, then this should be repeated with a new set of GPS positions.

Once the initial segment, position and direction have been deduced, subsequent positions are deduced from the odometer readings under the assumption that the vehicle is staying on the current road segment. Error estimates for the position are grown as the vehicle progresses. When the angular rate sensor shows a significant turn, the roads database is checked to see if such a turn exists within the error bounds of the estimated position, and if it does, then the position is assumed to be the location of the turn from the database, a new road segment is selected according to the angle of the turn, and the odometer is again used to deduce the position along the new road segment as the vehicle progresses. If these algorithms should fail at any stage, then the GPS can be used again to find another starting point in the database.

Although most map-matching systems will be more sophisticated than that described above, they will nonetheless be operating for most of the time with knowledge of which road segment the vehicle is traversing. Thus they can note each time that a traversal is made, which they can count as one mark, and apply the algorithms described earlier to derive a familiarity count, and a familiarity level.

When the map matching has failed, and we are using the GPS for positioning, this may be because the vehicle is using a road that is not in the database. In this case, we store the GPS positions for later matching against the database when it is updated, as we described for the matching of a sightings history. When map matching is working, we may choose to only store the familiarity levels and the parameters necessary to update them (e.g. the count) with each road segment. In this case, there may be more of a problem when the mapping database is updated. We may have to cope with new roads that have been added, roads in the database being given new IDs, or roads in the database being resegmented, perhaps because of an increased survey accuracy. In that case, we would have to match the old road segments against the new road segments as if they were a sighting history, but without the full detail that the sightings would have given us. A better implementation would also keep the sightings history as coordinates derived from the GPS and/or map-matching, and use that to match a new database in batch mode whenever it is necessary to recalculate the familiarity levels.

I claim:

1. A computerized method of selecting locations at which a moving object is stationary from a record of sightings of the object stored on a computer, where each sighting comprised a location and a time, the method comprising the steps of;
   identifying breaks in movement of the object;
   comparing the durations of the breaks in movement with the durations of preceding and succeeding periods of movement to determine those breaks whose durations have a predefined relationship with the durations of the periods of movement; and
   selecting said locations to be locations of each said determined break.

2. A method as claimed in claim 1, in which the the moving object is a vehicle having an ignition and the identifying step comprises identifying sets of sightings where the ignition of the vehicle was known to be switched off.

3. A method as claimed in claim 1, in which the identifying step comprises identifying periods of time during which no sightings were received for a period exceeding a predermined time.

4. A method as claimed in claim 1, in which the identifying step comprises identifying sets of locations when all subsequent ones of the locations of the set remain within a predetermined distance of an earliest one of the locations of the set for at least a predetermined minimum time.

5. A method as claimed in any one of claims 1 to 4, in which said predefined relationship is that the duration of the break is greater than the duration of at least one of the preceding and succeeding periods of movement.

6. A method of accessing a record of sightings of an object, where each sighting comprises a location and a time, to correlate a first event stored on a coomputer with at least one further event stored on said computer with said first event being associated with at least one of a location and a time provided independently of the database, the method comprising:
   interrogating the database with one of the at least one of a location and the time associated with the first event to retrieve a sighting;
   returning the other of the location and the time, not used in the previous interrogation step, for the retrieved sighting; and
   interrogating the database with the returned other of the location and the time to retrieve a further sighting;
   returning the other of the location and the time, not used in the previous interrogation step, for the further retrieved sighting; and
   using the returned other of the location and the time of the further retrieved sighting to locate said at least one further event which is correlated with the first event.

7. A method as claimed in claim 6, in which the first and at least one further event comprised a diary entry.

8. A method as claimed in claim 6, in which the first and at least one further event comprises recording of a photographic image.

9. A computerized method of calibrating route planning parameters in a route planning system in accordance with a record of sightings of an object stored on a computer, where each sighting comprises a location and a time, the method comprising:

receiving at least one start-of-route location and at least one end-of-route location;

analyzing at least some of the sightings to derive a value of at least one route planning parameter for a route between said at least one start-of-route location and said at least one end-of-route location; and modifying the at least one parameter in accordance with the derived value; wherein said analyzing at least some of the sightings comprises:

determining a list of segments that move between the received start-of-route location and the received end-of-route location by identifying breaks in movement of the object, comparing the durations of the breaks in movement with the durations of preceding and succeeding periods of the movement to determing those breaks whose durations have a predefined relationship with the druations of the periods of movement, and determining each segment to be a journey without any breaks satisfying said predefined relationship.

10. A method as claimed in claim 9, comprising augmenting the route planning system with common destinations and/or routes derived from the record.

11. A method as claimed in claim 9 or 10, in which the at least one parameter comprises a mean and a variance.

12. A method as claimed in claim 9, in which the at least one parameter comprises the travel time of a route segment.

* * * * *

UNITED STATES PATENT AND TRADEMARK OFFICE
CERTIFICATE OF CORRECTION

| | | |
|---|---|---|
| PATENT NO. | : 8,000,889 B2 | Page 1 of 1 |
| APPLICATION NO. | : 11/574329 | |
| DATED | : February 27, 2007 | |
| INVENTOR(S) | : Alan Henry Jones | |

It is certified that error appears in the above-identified patent and that said Letters Patent is hereby corrected as shown below:

Column 2, Line 28, please delete "DETAILED DESCRIPTION OF THE DRAWING";

Column 3, Line 54, please insert --DETAILED DESCRIPTION OF THE DRAWINGS--;

Column 6, Line 39, please delete "Ion" and insert --lon-- therefor;

Column 24, Claim 1, Line 10, please delete "comprised" and insert --comprises-- therefor;

Column 24, Claim 1, Line 11, please delete ";" and insert --:-- therefor;

Column 24, Claim 2, Line 20, please delete "the" after the;

Column 24, Claim 3, Line 26, please delete "predermined" and insert --predetermined-- therefor;

Column 24, Claim 6, Line 37, please delete "record" and insert --database-- therefor;

Column 24, Claim 6, Line 39, please delete "coomputer" and insert --computer-- therefor;

Column 24, Claim 7, Line 59, please delete "comprised" and insert --comprises-- therefor;

Column 25, Claim 9, Line 15, please delete "the" after of;

Column 26, Claim 9, Line 1, please delete "determing" and insert --determine-- therefor;

Column 26, Claim 9, Line 2, please delete "druations" and insert --durations-- therefor.

Signed and Sealed this
Twenty-second Day of November, 2011

David J. Kappos
*Director of the United States Patent and Trademark Office*